United States Patent
Malone et al.

(10) Patent No.: US 9,063,833 B2
(45) Date of Patent: Jun. 23, 2015

(54) PORTABLE TRANSCEIVER WITH VEHICLE SECURITY CONTROL AND LOCATE FEATURES

(71) Applicants: Thomas C. Malone, Miller Place, NY (US); James R. Tranchina, Dix Hills, NY (US); John DiCroce, Oceanside, NY (US); Shane Wilson, Clinton Township, MI (US)

(72) Inventors: Thomas C. Malone, Miller Place, NY (US); James R. Tranchina, Dix Hills, NY (US); John DiCroce, Oceanside, NY (US); Shane Wilson, Clinton Township, MI (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days.

(21) Appl. No.: 13/768,093

(22) Filed: Feb. 15, 2013

(65) Prior Publication Data
US 2013/0158747 A1    Jun. 20, 2013

Related U.S. Application Data

(63) Continuation of application No. 12/259,768, filed on Oct. 28, 2008, now Pat. No. 8,380,430.

(51) Int. Cl.
*G01C 21/16* (2006.01)
*G06F 17/00* (2006.01)
*B60R 25/24* (2013.01)
*B60R 25/33* (2013.01)
*G01C 21/20* (2006.01)

(52) U.S. Cl.
CPC ............... *G06F 17/00* (2013.01); *B60R 25/24* (2013.01); *B60R 25/33* (2013.01); *G01C 21/20* (2013.01)

(58) Field of Classification Search
CPC ............... G01C 21/26; G01C 21/3617; G01C 21/3632; G08G 1/096883; G08G 1/123
USPC ............... 701/410, 428, 431, 433, 439
See application file for complete search history.

(56) References Cited

U.S. PATENT DOCUMENTS

| | | | |
|---|---|---|---|
| 5,895,436 A * | 4/1999 | Savoie et al. ................. | 701/468 |
| 6,331,835 B1 | 12/2001 | Gustafson et al. | |
| 6,374,180 B1 | 4/2002 | Slominski et al. | |
| 6,489,921 B1 | 12/2002 | Wilkinson | |
| 6,529,142 B2 * | 3/2003 | Yeh et al. ...................... | 340/988 |
| 6,725,138 B2 * | 4/2004 | DeLuca et al. ................. | 701/36 |
| 6,791,477 B2 * | 9/2004 | Sari et al. ................. | 340/995.19 |
| 7,158,079 B2 * | 1/2007 | Motoyama ............... | 342/357.57 |
| 7,545,259 B2 | 6/2009 | Luo et al. | |
| 7,602,302 B2 * | 10/2009 | Hokuf et al. ............... | 340/573.3 |
| 7,847,709 B2 | 12/2010 | McCall et al. | |
| 8,380,430 B2 * | 2/2013 | Malone et al. ............... | 701/431 |
| 8,392,118 B2 * | 3/2013 | Korn et al. ..................... | 701/533 |
| 8,775,012 B2 * | 7/2014 | Podolak et al. ............. | 701/31.4 |
| 2001/0029415 A1 * | 10/2001 | Flick ............................. | 701/36 |
| 2004/0178908 A1 | 9/2004 | Sari et al. | |
| 2008/0201074 A1 * | 8/2008 | Bleckman et al. ............ | 701/211 |

(Continued)

*Primary Examiner* — Joseph C Rodriguez
(74) *Attorney, Agent, or Firm* — F. Chau & Associates, LLC

(57) ABSTRACT

A portable transceiver for locking and locating an automobile, includes a remote keyless entry system for locking the automobile; a locating device determining a location of the transceiver, wherein the remote keyless entry system and the locating device are housed in a pocket sized housing; and a processor deriving directional information from a current location to a waypoint, wherein in response to an activation of the remote keyless entry system, the locating device determines the waypoint corresponding substantially to that of the automobile.

16 Claims, 4 Drawing Sheets

(56) References Cited

U.S. PATENT DOCUMENTS

| | | | |
|---|---|---|---|
| 2009/0098907 A1* | 4/2009 | Huntzicker et al. | 455/556.1 |
| 2009/0109039 A1* | 4/2009 | Kellzi et al. | 340/584 |
| 2010/0318288 A1 | 12/2010 | Korn et al. | |
| 2010/0318293 A1* | 12/2010 | Brush et al. | 701/211 |
| 2010/0332116 A1* | 12/2010 | Sakashita | 701/201 |
| 2012/0303182 A1* | 11/2012 | Choi | 701/2 |

* cited by examiner

PORTABLE TRANSCEIVER WITH VEHICLE SECURITY CONTROL AND LOCATE FEATURES

CROSS-REFERENCE TO RELATED APPLICATIONS

This application is a Continuation Application of U.S. application Ser. No. 12/259,768, filed on Oct. 28, 2008, the disclosure of which is incorporated by reference herein in its entirety.

BACKGROUND OF THE INVENTION

1. Technical Field

The present disclosure relates to a portable transceiver communicating with a vehicle control system, more specifically, to a portable transceiver communicating with a vehicle control system and including a vehicle locator feature.

2. Discussion of the Related Art

A remote transmitter is typically used in conjunction with a remote keyless entry (RKE) system to allow a user to lock and unlock vehicle doors, trunks, control alarm systems, or activate vehicle features such as remote start, without the need to use a key. A remote transmitter typically includes a small handheld transmitter housing that can be mounted to a user's key chain. One or more small buttons are located on the housing to allow the user to send desired control signals to a receiver in a vehicle.

As RKE systems have become integrated with vehicle control systems, remote transmitters used therewith have been designed to handle additional non-RKE functions, such as arming/disarming alarms or remote start of the vehicle's engine, etc. As a result, such remote transmitters include additional switches or buttons while retaining the convenient small size of their predecessors. This, however, has led to remote transmitters having a multitude of finger-operated buttons thus complicating the operation thereof.

In an effort to reduce the proliferation of keys on remote transmitters, remote transmitters have been designed to include a user interface, such as a display, in combination with a small number of buttons.

In addition to the one-way communication between remote transmitters and vehicle control systems, remote transceivers have been developed for bi-directional communication. In particular, remote transceivers are capable of communicating with vehicle control or security systems while at the same time are able to receive status information associated with such systems.

Forgetting where a vehicle is parked can be a serious problem in large parking lots such as in shopping malls, multi-level parking lots, and the like.

Global Positioning System (GPS) devices are examples of a radio-based technology that provides direction and distance information to a pre-determined starting point (waypoint), and display this information on a display screen, for example.

GPS is a world-wide radio navigation system formed by a group of 24 satellites and their associated ground stations. GPS uses these satellites, appropriately called NAVSTAR (Navigation Satellite Timing and Ranging), to calculate ground positions. The basis of GPS operation is the use of triangulation from the satellites. To triangulate, a GPS receiver measures distance using the travel time of radio signals. However, to measure travel time, GPS needs very accurate timing, plus it needs to know exactly where the satellites are in space. To solve this problem, each of the 24 satellites is inserted into a high enough orbit (12,000 miles) to preclude interference from other objects, both man-made and natural, and to insure overlapping coverage on the ground so that a GPS receiver can always receive from at least four of them at any given time. In addition, compensation is inserted for any delay the signal experiences as it travels through the atmosphere to the receiver.

With the satellites operating at 12,000 miles above the earth's surface, they are arranged in strategic positions and orbit the earth every 12 hours. Each satellite transmits a low-power radio signal in the UHF frequency range; the frequencies used are designated as L1, L2, and so forth. GPS receivers listen on the L1 frequency of 1575.42 MHZ. This signal, since it is line-of-sight, will reach the ground receiver unless it is obstructed by solid objects, such as buildings and mountains.

The L1 signal is accompanied by a pair of pseudo-random signals (referred to as pseudo-random code) which is unique to each satellite. These codes are identified by the GPS receiver and allow for the calculation of the travel time from the satellite to the ground. If this travel time is multiplied by the speed of light, the result is the satellite range (distance from satellite to receiver). The navigation information provided by each satellite consists of orbital and clock data, plus delay information based on an ionospheric model. Signal timing is provided by highly accurate atomic clocks. The GPS receiver uses NAVSTAR satellite signals as a way of determining exact position on earth.

GPS receivers are intended for navigational use, wherein the calculated latitude and longitude location is displayed on some form of geographic or topographical map. These GPS receivers may be used to locate a vehicle but they can be bulky and require the user to carry them around along with their RKE system. Further, the user has to remember to activate the GPS receiver to set the waypoint of a parked vehicle, for example.

SUMMARY OF THE INVENTION

A portable transceiver for locking and locating an automobile, according to an exemplary embodiment of the present invention, includes a remote keyless entry system for locking the automobile; a locating device determining a location of the transceiver, wherein the remote keyless entry system and the locating device are housed in a pocket sized housing; and a processor deriving directional information from a current location to a waypoint, wherein in response to an activation of the remote keyless entry system, the locating device determines the waypoint corresponding substantially to that of the automobile.

The locating device may include a Global Positioning System (GPS) receiver, a radio-frequency (RF) ranging device, or a triaxial accelerometer device; and may further include an altimeter for measuring an elevation.

The portable transceiver may further include a display for displaying the directional information.

The directional information may include a direction from the current location to the waypoint, a distance from the current location to the waypoint, and an elevation direction to the waypoint.

The display may be a liquid crystal display (LCD), a light emitting diode (LED) array, an organic light-emitting diode (OLED) graphic display, a plasma display, a glasses-free three-dimensional (3D)-enabled display, an aluminum gallium arsenide (AlGaAs) LED array, or a liquid crystal on silicon (LCoS) micro display, for example.

The directional information may be displayed on the display using a compass style pointer, a set of arrows, or an area map.

The waypoint may be determined by the locating device when a lock vehicle command is input to the remote keyless entry system.

The current location may be determined by the locating device when a find vehicle command is input to the remote keyless entry system.

The portable transceiver may further include a transceiver connected to an antenna for transmitting vehicle commands to the automobile.

According to an exemplary embodiment of the present invention, a portable transceiver for locking and locating an automobile, the automobile including a first locating device for determining a first location, includes a remote keyless entry system for locking the automobile; a second locating device determining a second location of the transceiver, wherein the remote keyless entry system and the second locating device are housed in a pocket sized housing; and a processor deriving directional information from the second location to the first location, wherein in response to an activation of the remote keyless entry system, the second locating device communicates with the automobile to acquire the first location determined by the first locating device.

The first and second locating devices may include respective Global Positioning System (GPS) receivers.

The first and second locating devices may further include respective altimeters for measuring first and second elevations.

The portable transceiver may further include a display for displaying the directional information.

The directional information may include a direction from the second location to the first location, a distance from the second location to the first location, and an elevation direction to the first location.

The display may be a liquid crystal display (LCD), light emitting diode (LED) array, organic light-emitting diode (OLED) graphic display, plasma display, glasses-free three-dimensional (3D)-enabled display, aluminum gallium arsenide (AlGaAs) LED array, or a liquid crystal on silicon (LCoS) micro display.

The directional information may be displayed on the display using one of a compass style pointer, a set of arrows, and an area map.

The vehicle may further include a transceiver for communicating with the second locating device.

The first and second locations may be determined by the locating device when a find vehicle command is input to the remote keyless entry system.

The portable transceiver may further include a transceiver connected to an antenna for transmitting vehicle commands to the automobile.

BRIEF DESCRIPTION OF THE DRAWINGS

A more complete appreciation of the present disclosure and many of the attendant aspects thereof will be readily obtained, as the same becomes better understood by reference to the following detailed description, when considered in connection with the accompanying drawings, wherein.

DETAILED DESCRIPTION OF EXEMPLARY EMBODIMENTS

Figure 1:
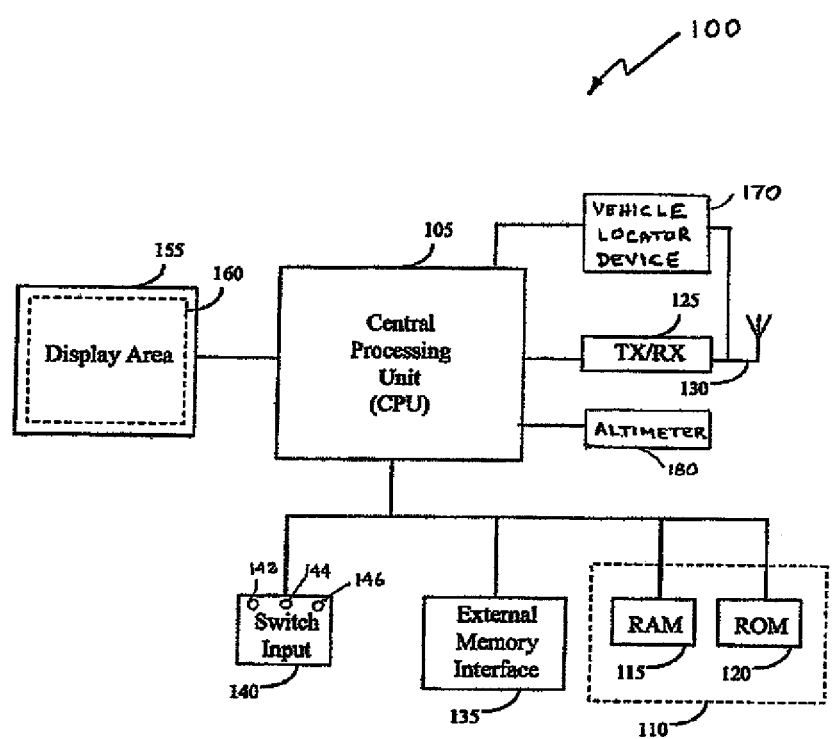
FIG. 1 is a block diagram of a portable transceiver with vehicle security control and locate features, according to an exemplary embodiment of the present invention.

In describing exemplary embodiments of the present disclosure illustrated in the drawings, specific terminology is employed for the sake of clarity. However, the present disclosure is not intended to be limited to the specific terminology so selected, and it is to be understood that each specific element includes all technical equivalents which operate in a similar manner.

Exemplary embodiments of the present invention seek to provide a portable transceiver with vehicle security control and locate features. The security control features may include the arming and disarming of a vehicle alarm, and the locking and unlocking of the vehicle doors.

FIG. 1 illustrates a remote transceiver 100 for communicating with a vehicle control system according to an exemplary embodiment of the present invention. The vehicle control system may include security functions such as the arming and disarming of a vehicle alarm, and the locking and unlocking of the vehicle doors. As shown in FIG. 1, the remote transceiver 100 includes a central processing unit (CPU) 105 coupled to a memory 110. The memory 110 may include a random access memory (RAM) 115 and a read only memory (ROM) 120. The memory 110 may also include a database, an electrically erasable programmable read only memory (EEPROM), or a combination thereof. The CPU 105 processes data and controls components of the remote transceiver 100. The RAM 115 functions as a data memory that stores data used during execution of a program in the CPU 105 and is used as a work area. The ROM 120 functions as a program memory for storing a program executed in the CPU 105.

A transceiver 125 and an antenna 130 are also coupled to the CPU 105. The transceiver 125 includes a transmitter and a receiver housed together for performing transmitting and receiving functions, respectively. A vehicle locator device 170 is also coupled to the antenna 130 and the CPU 105. An optional altimeter 180, such as a barometric pressure device, may also be coupled to the CPU 105.

An external memory interface 135 may be further coupled to the CPU 105. The external memory interface 135 may be, for example, a memory card interface for enabling the remote transceiver 100 to be upgraded with new functions and/or features associated with the remote transceiver 100 or a vehicle control or security system. It is to be understood that the external memory interface 135 could be a universal serial bus (USB), Ethernet, FireWire, infrared (IR) or Bluetooth interface for receiving and in some cases requesting updated functions and/or features to be used by the remote transceiver 100.

The remote transceiver 100 includes a button or switch type input 140 that may include buttons, switches, a keypad, scroll wheels or a combination thereof, and is employed by a user to perform certain functions on and with the remote transceiver 100.

By way of example, the switch type input 140 may include button 142 used to lock the vehicle, button 146 used to unlock the vehicle, and button 144 used to find the vehicle. Other buttons such as buttons for arming and disarming a vehicle alarm (not shown) may also be included in the switch type input 140.

A display 155 is connected to the CPU 105. The display 155, which may be a liquid crystal display (LCD), light emitting diode (LED) array, organic light-emitting diode (OLED) graphic display, plasma display, glasses-free three-dimensional (3D)-enabled display, aluminum gallium arsenide (AlGaAs) LED array, or a liquid crystal on silicon (LCoS) micro display, may include a dot-matrix display area 160 or a graphic area for displaying information thereon in either text or icons.

The vehicle locator device 170 determines the location (waypoint) of the transceiver 100 in response to a lock vehicle command input entered by pressing the lock vehicle button 142, for example. Because the waypoint is determined whenever the vehicle is locked, the waypoint represents substantially the location where the vehicle is parked.

Further, because the vehicle locator device 170 may not be capable of accurately measuring elevation, the altimeter 180 may be used to measure an elevation of the waypoint. The elevation measurement of the waypoint is particularly important to guide a person back to their vehicle in a multi-level parking garage, for example.

In an exemplary embodiment of the present invention a GPS locating device may be used as the vehicle locator device 170. However, other vehicle locator devices may be used such as devices using radio-frequency (RF) ranging techniques or triaxial accelerometers, independently or in combination with the GPS locating device, as will be described below.

Figure 2:
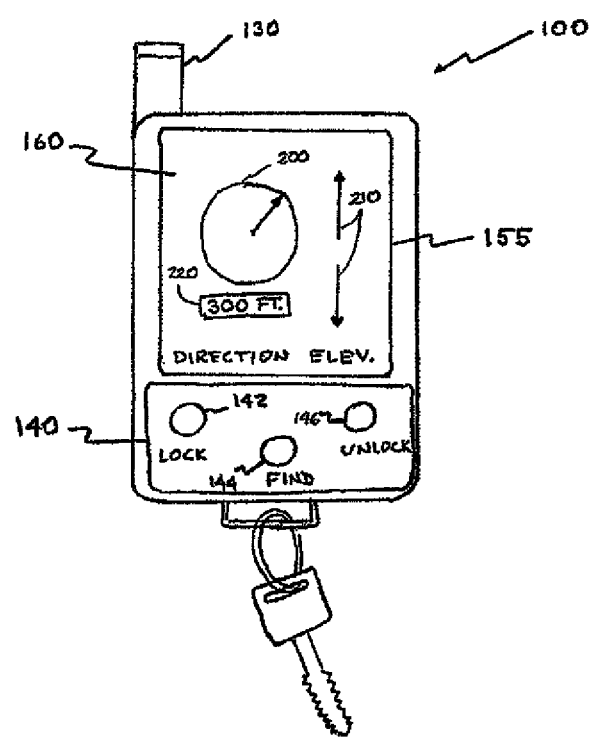
FIG. 2 illustrates a front view of the portable transceiver, according to an exemplary embodiment of the present invention.

FIG. 2 illustrates a front view of the remote transceiver 100, according to an exemplary embodiment of the present invention. The display area 160 of the remote transceiver 100 may include a compass style pointer 200, a set of arrows 210 to display an elevation direction to the measured waypoint, and distance to the waypoint indicator 220.

To find the location of the parked vehicle, for example, the user depresses the find vehicle button 144 and follows directions displayed in the display area 155 of the remote transceiver 100. The directions may also be displayed on an area map.

The transceiver 100 may also include audible indicators to assist the user in finding the location of the parked vehicle. These audible indicators may include a beeping tone of varying frequency depending on the distance from the vehicle, or an actual "audio utterance" of directions and remaining distance to the vehicle.

The CPU 105 derives, when receiving a find vehicle command, the displayed directions from directional information of the user's current location, that is, the location where the find vehicle button 144 was pressed, to the waypoint.

The directions may be displayed using the compass style pointer 200 which would, by using an arrow, direct the user to the vehicle, the set of arrows 210 would direct the user to go up or down to find the vehicle, and the distance to the vehicle may be displayed on the distance indicator 220.

Figure 3:
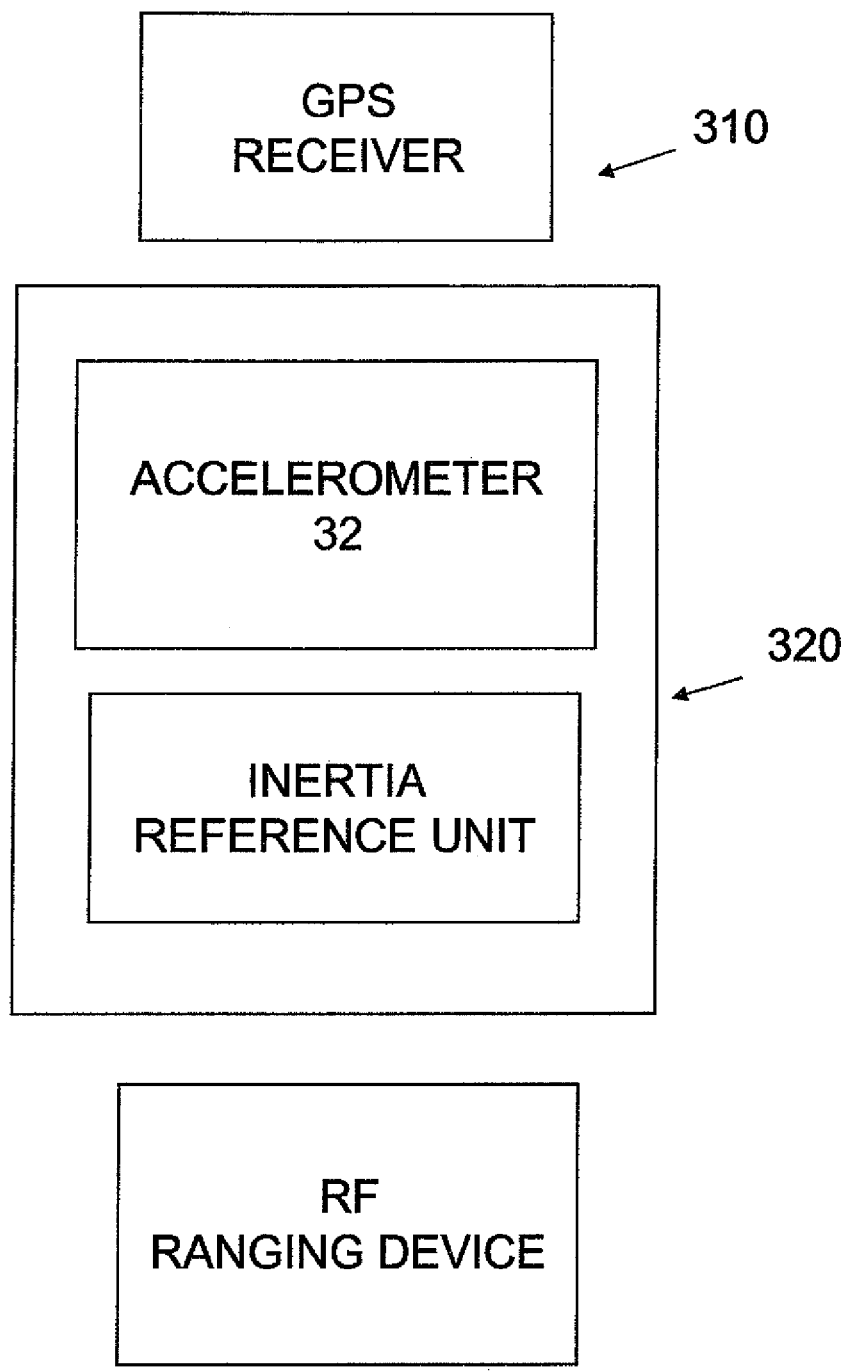
FIG. 3 is a block diagram of components of a vehicle locator device according to an exemplary embodiment of the present invention.

FIG. 3 shows a vehicle locator device 170 according to an exemplary embodiment of the present invention. As shown, the vehicle locator device 170 includes a GPS receiver 310, an accelerometer device 320, and an RF ranging device. The three devices shown can be used independently of one another or in any combination to perform vehicle location functions. For example, if the user of the vehicle location device according to an embodiment of the present invention parks his vehicle primarily in an environment where GPS signals are readily available, such as outdoors, then a GPS receiver 310 by itself will suffice to receive signals necessary for processing to guide the user back to his vehicle, essentially as described above. However, there are environments where GPS signals from GPS satellites cannot be received, such as within an indoor parking lot, and use of the GPS receiver 310 by itself may not be effective in locating the vehicle.

According to an exemplary embodiment of the present invention, an accelerometer device 320 is used to track movement of the user to guide the user back to a vehicle. The accelerometer device 320 includes a multi-axis accelerometer 322 and an inertia reference unit 324. The multi-axis accelerometer can be a triaxial accelerometer that tracks in three axis the orientation of the remote transceiver 100. A triaxial accelerometer measures and outputs acceleration data in three dimensions, e.g., over X, Y, and Z axis. Acceleration in any one axis can be integrated to obtain velocity, and the velocity data can be further integrated to obtain the distance of travel. The triaxial accelerometer includes a gyroscopic function that measures a shift in the axial direction as well to thus provide the distance and direction of travel. An inertia reference unit (IRU) can be used to detect change in orientation beyond an ordinary amount, such as when a device is pointed in an axial direction and then pointed in a totally different direction without axial movement, such as when the device is put away in the user's purse or pocket.

Figure 4:
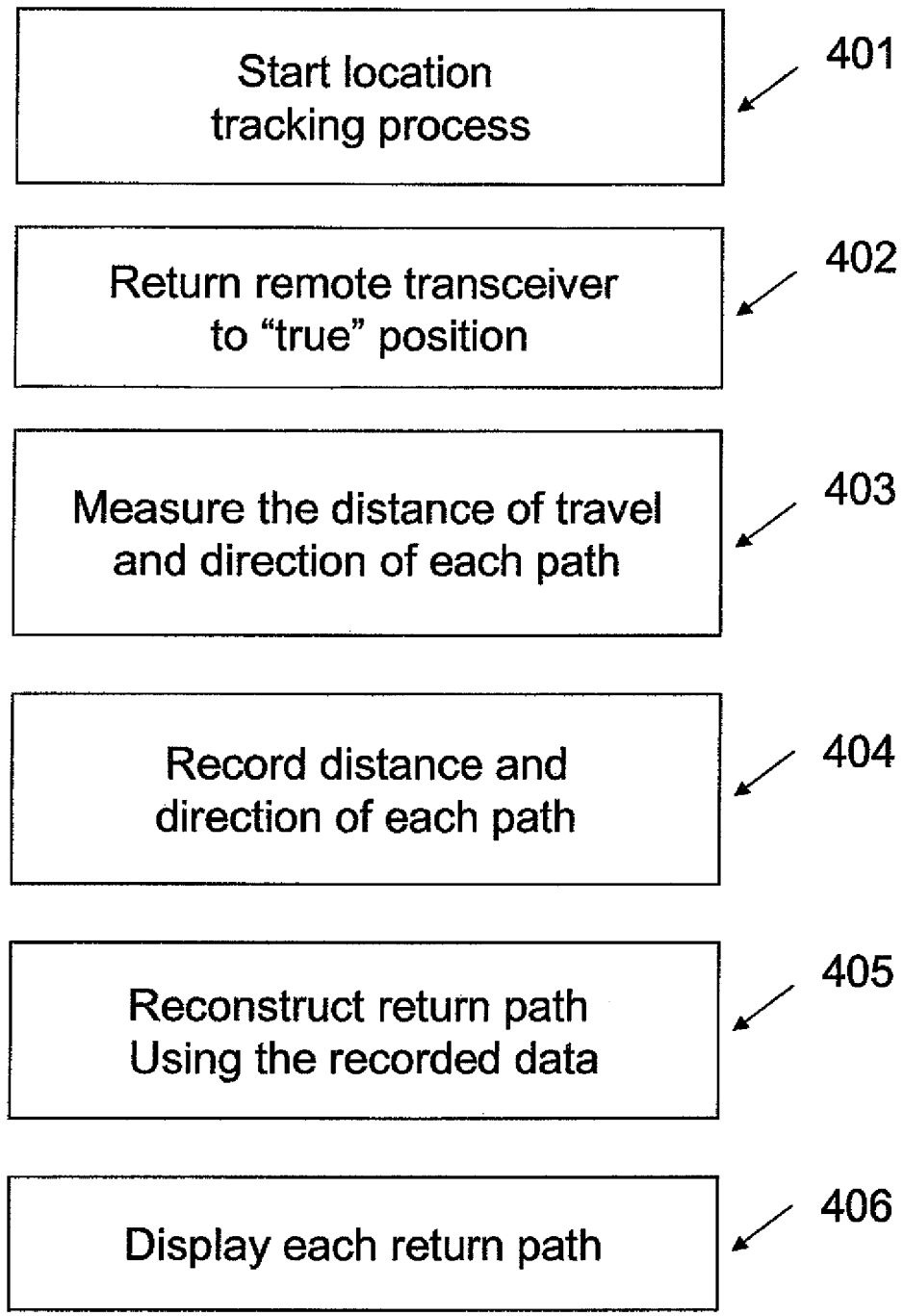
FIG. 4 is a flowchart of a process using an accelerometer and an IRU to direct a user back to his vehicle according to an exemplary embodiment of the present invention.

FIG. 4 is a flowchart of a process using an accelerometer and an IRU to direct a user back to his vehicle according to an exemplary embodiment of the present invention. Upon leaving the vehicle, the user starts the location tracking process by pressing on the transmitter. According to one embodiment, the arming of the vehicle's security system and the start of the location ranging process can be effected by pressing one button on the transmitter. Upon initiation, the accelerator starts measuring the distance the transmitter is moved away from the vehicle in three dimensions (step 401). Compensation is made to return the remote transceiver 100 to the 'true' position when the IRU detects a large change in orientation of the remote transceiver 100 without substantial axial movement (step 402), such as when the transmitter is put away, e.g., in the user's pocket or purse. The accelerometer measures the distance and direction of each path the user traverses away from the vehicle (step 403). Data on each change in direction is recorded (step 404) to facilitate later retrieval by the CPU 105 to reconstruct the return path for the user (step 405). As each path is reconstructed for the user, upon the user's pressing of a 'locate' button, the CPU 105 causes the display of the return path on the display (step 406). The display can be in radial distance, vertical height, bread crumb trail, or flashing arrow, etc.

According to another exemplary embodiment of the present invention, an RF ranging device may be used as the vehicle locator device 170. The RF ranging device operates by determining a location by sending out a series of RF pulses of a particular frequency or frequencies, and measuring received signal strengths (RSS) to calculate the location.

RF ranging devices are suitable for indoor use in locations such as multi-level parking garages in buildings.

Since indoor environments present shadows and reflections of the RF signals from walls and objects, an RF ranging device may use a plurality of frequencies, referred to as frequency diversity, to perform its ranging operations. In an exemplary embodiment of the present invention, four frequencies may be used such as 315 MHz, 434 MHz, 900 MHz, and 1.6 GHz.

Furthermore, in another exemplary embodiment of the present invention, a GPS system, an altimeter, and a transceiver (not shown) may be installed in the vehicle. When the user presses the find vehicle button 144, the remote transceiver 100 interrogates, via the transceiver in the vehicle, the GPS system in the vehicle to obtain its location.

The communication between the vehicle and the remote transceiver 100 is performed using their respective transceivers. To communicate with each other, the transceivers may use wireless techniques such as Bluetooth, Wi-Fi, or cellular technologies.

After the remote transceiver 100 receives the vehicle's location from the vehicle via the transceiver 125, the CPU 105 derives the directions to the vehicle from the user's current location to the vehicle's location.

Having the directions to the vehicle, the user follows the directions displayed in the display area 155, or the audible indicators, of the remote transceiver 100 to find the vehicle, as described above.

Having described exemplary embodiments of the present invention, it is to be understood that the invention is not limited to the disclosed embodiments, but, on the contrary, is intended to cover various modifications and equivalent arrangements included within the spirit and scope of the disclosure.

What is claimed is:

1. A portable electronic device, comprising:
   a transceiver configured to unlock a vehicle via a cellular connection;
   a locating device configured to determine a waypoint;
   a processor configured to provide data to guide a user from a current location to the waypoint, wherein the data comprises at least one of a direction from the current location to the waypoint, a distance from the current location to the waypoint, and an elevation direction from the current location to the waypoint; and
   a display configured to present the data to the user, wherein
   the locating device is configured to track a distance and a direction of a plurality of traversed paths of the portable electronic device relative to the waypoint,
   the processor is configured to process the plurality of traversed paths, and reconstruct a return path back to the waypoint, and
   the display is configured to display at least one of a pointer indicating a direction from a current one of the plurality of traversed paths to the waypoint, a waypoint indicator indicating a distance from the current one of the plurality of traversed paths to the waypoint and a set of arrows indicating an elevation direction from the current one of the plurality of traversed paths to the waypoint.

2. The portable electronic device of claim 1, wherein the transceiver is configured to start an engine of the vehicle via at least one of the cellular connection and a Bluetooth connection.

3. The portable electronic device of claim 1, wherein the transceiver is further configured to start the engine of the vehicle via the cellular connection.

4. The portable electronic device of claim 3, wherein the locating device is a global positioning system (GPS) receiver.

5. The portable electronic device of claim 1, wherein the transceiver is further configured to unlock the vehicle and start the engine of the vehicle via a Bluetooth connection.

6. The portable electronic device of claim 5, wherein the locating device is a global positioning system (GPS) receiver.

7. The portable electronic device of claim 1, wherein the data presented to the user comprises a bread-crumb trail indicating a return path from the current location to the waypoint.

8. The portable electronic device of claim 1, wherein the locating device is configured to determine the waypoint upon a lock vehicle command being transmitted from the portable electronic device to the vehicle.

9. The portable electronic device of claim 1, wherein the locating device is configured to initiate a tracking procedure that measures a distance that the portable electronic device is moved away from the waypoint upon unlocking the vehicle.

10. A portable electronic device 1, comprising:
    a transceiver configured to unlock a vehicle via at least one of a cellular connection and a Bluetooth connection;
    a locating device configured to determine a waypoint;
    a processor configured to provide data to guide a user from a current location to the waypoint, wherein the data comprises at least one of a direction from the current location to the waypoint, a distance from the current location to the waypoint, and an elevation direction from the current location to the waypoint; and
    a display configured to present the data to the user, wherein
    the locating device is configured to track a distance and a direction of a plurality of traversed paths of the portable electronic device relative to the waypoint,
    the processor is configured to process the plurality of traversed paths, and reconstruct a return path back to the waypoint, and
    the display is configured to display at least one of a pointer indicating a direction from a current one of the plurality of traversed paths to a next one of the plurality of traversed paths, a waypoint indicator indicating a distance from the current one of the plurality of traversed paths to the next one of the plurality of traversed paths, and a set of arrows indicating an elevation direction from the current one of the plurality of traversed paths to the next one of the plurality of traversed paths.

11. A method of communicating with a vehicle via a portable electronic device, comprising:
    unlocking the vehicle via at least one of a cellular connection and a Bluetooth connection;
    determining a waypoint;
    providing data to guide a user from a current location to the waypoint based on at least one of a direction from the current location to the waypoint, a distance from the current location to the waypoint, and an elevation direction from the current location to the waypoint;
    tracking a distance and a direction of a plurality of traversed paths of the portable electronic device relative to the waypoint;
    processing the plurality of traversed paths, and reconstructing a return path back to the waypoint; and
    displaying at least one of a pointer indicating a direction from a current one of the plurality of traversed paths to a next one of the plurality of traversed paths, a waypoint indicator indicating a distance from the current one of the plurality of traversed paths to the next one of the plurality of traversed paths, and a set of arrows indicating an elevation direction from the current one of the plurality of traversed paths to the next one of the plurality of traversed paths.

12. The method of claim 11, further comprising starting an engine of the vehicle via at least one of the cellular connection and a the Bluetooth connection.

13. The method of claim 11, wherein the waypoint and the current location are determined using a global positioning system (GPS) receiver.

14. The method of claim 11, wherein the data provided to the user comprises a bread-crumb trail indicating a return path from the current location to the waypoint.

15. The method of claim 11, further comprising:
transmitting a lock vehicle command from the portable electronic device to the vehicle,
wherein the waypoint is determined upon transmitting the lock vehicle command.

16. The method of claim 11, further comprising:
initiating a tracking procedure that measures a distance that the portable electronic device is moved away from the waypoint upon unlocking the vehicle.

\* \* \* \* \*